United States Patent [19]

Nyberg et al.

[11] 4,354,265

[45] Oct. 12, 1982

[54] METHOD AND AN APPARATUS FOR TRANSFERRING DIGITAL INFORMATION IN A TELEPHONE SYSTEM

[75] Inventors: Karl F. L. Nyberg; Kjell S. Josefsson, both of Tyresö, Sweden

[73] Assignee: Telefonaktiebolaget L M Ericsson, Stockholm, Sweden

[21] Appl. No.: 154,417

[22] PCT Filed: Dec. 19, 1978

[86] PCT No.: PCT/SE78/00098

§ 371 Date: Aug. 22, 1979

§ 102(e) Date: Jul. 31, 1979

[87] PCT Pub. No.: WO79/00422

PCT Pub. Date: Jul. 12, 1979

[30] Foreign Application Priority Data

Dec. 22, 1977 [SE] Sweden .............................. 7714644

[51] Int. Cl.³ ..................... H04J 3/12; H04M 11/06
[52] U.S. Cl. ................................. 370/111; 179/2 DP
[58] Field of Search ............... 370/111, 110, 118, 80, 370/91; 179/18 AD, 2 DP

[56] References Cited

U.S. PATENT DOCUMENTS

| | | | |
|---|---|---|---|
| 3,226,482 | 12/1965 | Wright | 370/111 |
| 3,491,206 | 1/1970 | Sheridan | 370/111 |
| 3,492,429 | 1/1970 | Schroeder | 370/111 |
| 3,727,005 | 4/1973 | Franaszek | 370/110 |
| 3,735,048 | 5/1973 | Tomsa et al. | 370/111 |
| 3,978,290 | 8/1976 | Sarma | 370/110 |

FOREIGN PATENT DOCUMENTS 1203768 9/1970 United Kingdom ................ 370/111

Primary Examiner—Douglas W. Olms
Attorney, Agent, or Firm—Hane, Roberts, Spiecens & Cohen

[57] ABSTRACT

In a telephone system for digitalized speech transmission additional digital information is transferred without disturbing a speech communication in progress. At the sending side, time slots for the transmission of the additional digital information are created by momentarily suppressing the digital speech signals transmitted on a digital channel and, at the receiving side, the digital information is extracted from the time slots and replaced by digital signals which constitute a continuous amplitude function starting from the amplitude value which was transmitted immediately before the time slot. To distinguish the additional digital information from speech signals a special identifying code is added at the sending side. The speech transmission may employ either Delta Modulation or Pulse Code Modulation.

5 Claims, 4 Drawing Figures

METHOD AND AN APPARATUS FOR TRANSFERRING DIGITAL INFORMATION IN A TELEPHONE SYSTEM

FIELD OF INVENTION

The present invention relates to a method and an apparatus, for use in a telephone system of the type wherein the amplitude values of speech signals are transmitted in digital form, which allows additional digital information to be transmitted without disturbing a speech communication in progress.

DESCRIPTION OF PRIOR ART

In PABX systems especially, it is desirable to be able to transmit certain digital information to a telephone set, for example to light up indicator lamps. Generally, this is accomplished by means of extensive wiring between the PABX-exchange and the telephone set in question, for example an operator's position, but if the transmission distance is long it might instead be advantageous to arrange a two wire data connection for transmitting the digital information serially in coded form.

SUMMARY OF THE INVENTION

In telephone systems of the type mentioned in the preamble of the claim it is possible to utilize the same kind of signal transmission as the one which is used for the speech signals also for the other information. In order to create a greater flexibility in the system it would naturally be advantageous if the use of an extra pair of wires to the apparatus in question could be avoided and instead the additional information could be transmitted on the telephone channel. The problem is to achieve such an information transfer without considerably disturbing a speech communication in progress. It is the purpose of the invention to solve this problem. The characteristics of the invention appear from the claims.

BRIEF DESCRIPTION OF THE DRAWINGS

The invention will be described more in detail by means of an embodiment and with reference to the accompanying drawings in which.

PREFERRED EMBODIMENTS

Either PCM or Delta modulation may be used to convert speech signals to digital form. Both types of modulation are in principle applicable to the invention but in the chosen embodiments Delta modulation is assumed. The digitalized speech signals are consequently transmitted as a bit stream where the variations of amplitude of the speech signals are represented by the transmitted bit pattern. A stream of alternating ones and zeros then represents a constant signal amplitude while a sequence of only ones or zeros corresponds to a considerable amplitude increase or amplitude decrease respectively. According to the invention transmission of additional digital information on the telephone channel is made possible by the fact that the digitalized speech signals are momentarily suppressed to create a time slot for the additional digital information.

At the receiving side this additional digital information must not reach the circuits for receiving the speech signals as it would give rise to a completely uncontrolled amplitude variation in the demodulated signal. The original suppressed digitalized speech signals cannot be restored at the receiving side and therefore they must be replaced by digital signals of a corresponding duration being so chosen that they, as far as possible, mask the discontinuity in the received signals. Practical tests have shown that a good masking effect is obtained if, according to the invention, a replacement signal is chosen which maintains the speech amplitude which was present immediately before the time slot was created as above. With Delta modulation, the replacement signal thus can comprise alternating ones and zeros. With PCM, a code which is identical with the one received immediately before the time slot would suitably have been used. As an alternative, however, it should have been possible in the PCM-case to bridge the time slot by cutting off the analogue signal to the telephone set. Certainly this cutting off of the signal could be used also with Delta-modulation but it is nonetheless important to provide the digital-analogue-converter with the above mentioned replacement signal in order to avoid extreme amplitude jumps in the demodulated signal.

Figure 1:
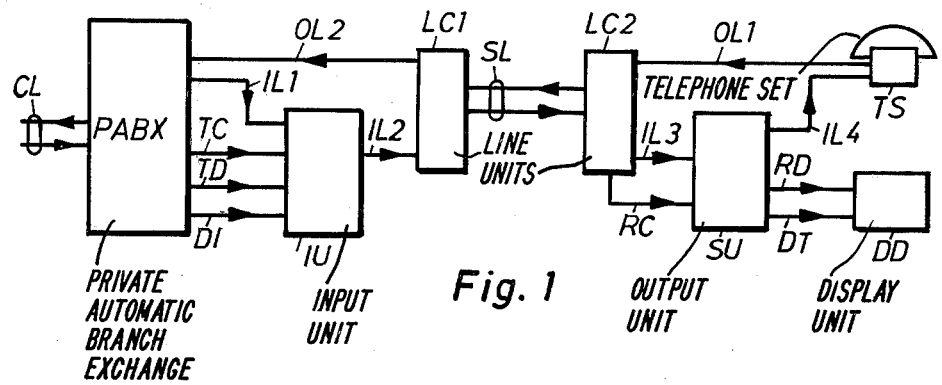
FIG. 1 shows a block diagram of a telephone system in which the invention is applied.

The system shown in FIG. 1 has a private automatic branch exchange PABX for transferring telephone traffic between a central line CL and a number of extension lines, one of these lines SL being shown, an input unit IU for providing digital informtion according to the invention, a first line unit LC1 being an adaptation to the line SL on the exchange side, a second line unit LC2 being an adaptation to the line SL on the subscriber side, a telephone set TS, an output unit SU for separating the digital information provided by the input unit IU and a data display unit DD for indication of the digital information for example by means of numerical indicators. Speech signals coming in on the central line CL are, according to the embodiment, delta modulatetd and are transmitted through the exchange PABX, path IL1, the input unit IU, path IL2, the line unit LC1, the extension line SL, the line unit LC2, path IL3, the output unit SU and path IL4 to the telephone set TS. In the opposite direction the delta modulated speech signals are transmitted from the telephone set TS through path OL1, the line unit LC2, the extension line SL, the line unit LC1, path OL2 and the exchange PABX to the central line CL. The exchange PABX has circuits by means of which a bit time signal in a known manner is derived from the bit stream arriving through the central line CL and fed as a sending clock signal on path TC to the input unit IU. The information that is to be transmitted to the display unit DD is carried on a data bus TD and the transmission is initiated by means of an indication signal on path DI. The operation of the input unit IU will be described later. In the line unit LC1, are mainly converted the signals to a form which is suitable for transmission on the line SL and in the unit LC2 an opposite conversion is performed. Furthermore a new derivation of the bit time signal is performed in the line unit LC2, which bit time signal is transmitted to the output unit SU as a receiving clock signal on path RC. In a manner which will be described later the transmitted information is separated in the output unit SU and is fed to the display unit DD on the data bus RD together with an indication signal on path DT at the same time as a replacement signal is transmitted to the telephone set TS through path IL4.

Figure 2:
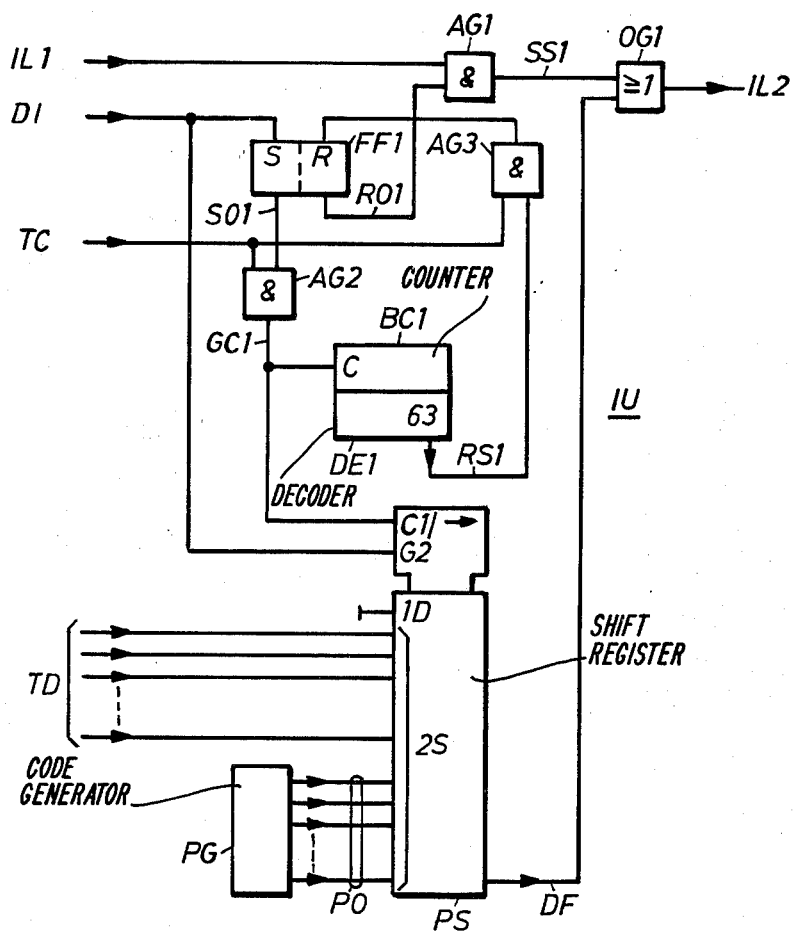
FIG. 2 is a block diagram of an input unit for feeding other information onto a digital speech channel according to the invention.

According to the embodiment in FIG. 2 the input unit IU comprises a bistable flip-flop FF1, a binary counter BC1 with associated decoder DE1, a shift register PS, a code generator PG, three AND-gates AG-1–AG3 and an OR-gate OG1. The delta modulated speech signals arriving on path IL1 are fed to one of the inputs of the gate AG1 and at 1-state on path RO1 from the flip-flop FF1 the signals are forwarded through path SS1 and the gate OG1 to the path IL2. When an indication signal is received on the path DI the flip-flop FF1 is set putting the output SO1 in the 1-state and the output RO1 in the 0-state. The AND-gate AG1 will then be closed but instead the gate AG2 is opened for the bit time signals on the path TC. The indication signal on path DI is fed not only to the input S on the flip-flop FF1 but also to the input G2 on the shift register PS whereby a parallel reading is performed of the bit pattern which appears on the output PO from the code generator PS as well as of the data signals which appear on the data bus TD. The bit time signals on the output GC1 from the gate AG2 arrive at the input C on the binary counter BC1 and the input C1 on the shift register PS. As a result of this the counter BC1 starts to count while the contents of the shift register PS are fed out in series on the path DF to the OR-gate OG1 and further to the path IL2. First the bit pattern being read from the code generator PG is fed out and after that the data signals being read from the data bus TD. The bit pattern serves as a synchronizing signal and is chosen so that it cannot be imitated by the speech signals. According to the embodiment, a series consisting of 16 ones is chosen. The data signals are assumed to contain 48 bits and thus the synchronizing signal and the data information together form a data block consisting of 64 bits. At the same time as the last data bit in the block is fed to the output DF the counter BC reaches the position 63 whereby the decoder DE1 feeds a 1-state on the path RS1 to the AND-gate AG3. The next bit time pulse on the path TC therefore passes the gate AG3 and resets the flip-flop FF1 through the input R at the same time as a last bit time pulse on the path GC1 resets the counter BC1 to start position. During the time the contents in the shift register PS were fed on the path DF an 0-state was fed to the shift register on the input 1D so that after 64 shift pulses the shift register is full of zeros and ready for a new reading operation with signals from the paths PO and TD.

Figure 3:
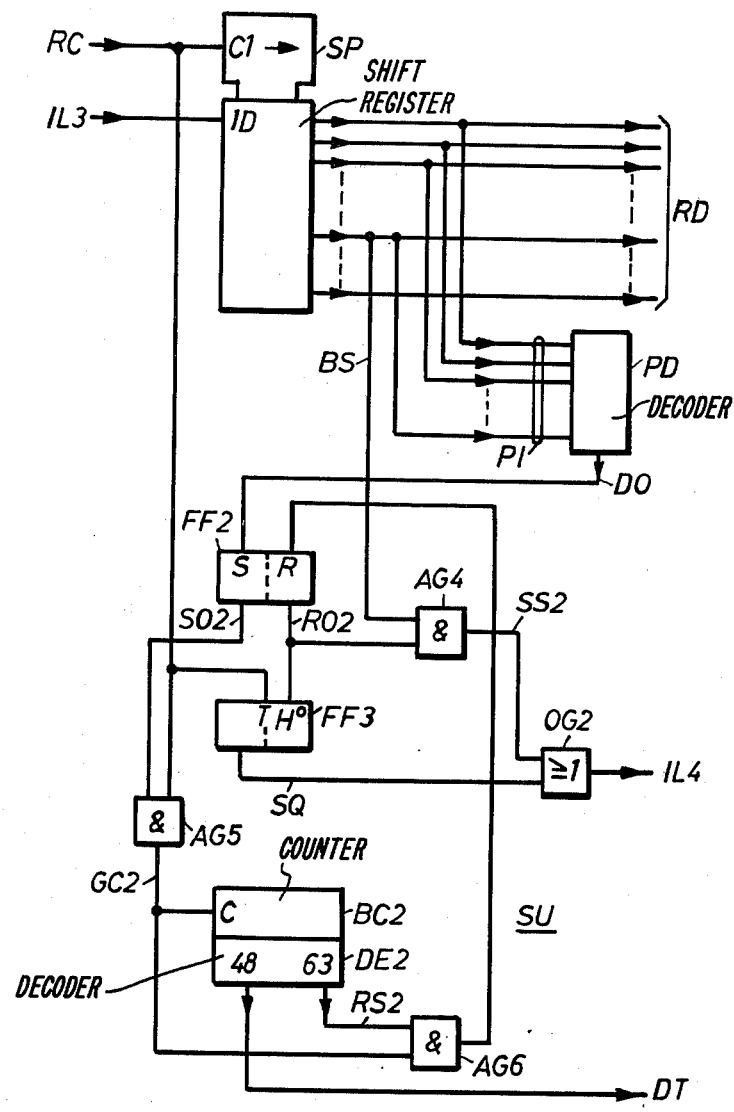
FIG. 3 is a block diagram of an output unit for separating such other information being transmitted on the digital speech channel according to the invention.

FIG. 3 shows an embodiment of the output unit SU comprising a shift register SP with an associated decoder PD, two bistable flip-flops FF2 and FF3, a binary counter BC2 with an associated decoder DE2, three AND-gates AG4–AG6 and an OR-gate OG2. The bit time signals on the path RC are fed to the input C1 on the shift register SP, the input T on the flip-flop FF3 and one of the inputs on the gate AG5. The path IL3 is connected to the input 1D on the shift register SP and by means of the bit time signals, the signals arriving at the input 1D are shifted through the shift register in order to be fed out on the path BS to the AND-gate AG4 after the sixteenth step in the register. It is assumed that the flip-flop FF2 is reset to zero, the output RO2 thus being in the 1-state and the gate AG4 being open for the signals on the path BS. Therefore these signals can be fed further through the path SS2 and the OR-gate OG2 on to the path IL4. As soon as the above mentioned bit pattern consisting of 16 ones appears in the first part of the shift register SP corresponding to the outputs PI, this is indicated on the output DO from the decoder PD and results in the flip-flop FF2 switching over to 1-state. The gate AG4 is then closed and the gate AG5 is opened at the same time as the flip-flop FF3 is no longer clamped by its input $H_O$. The latter therefore starts generating an alternating signal concurrently with the clock pulses from the input RC. This alternating signal is fed out on path IL4 instead of the signal on path BS as long as the flip-flop FF2 maintains its 1-state at the same time as the counter BC2 counts the clock pulses which are fed on the path GC2 from the AND-gate AG5. After 48 clock pulses the synchronizing bit pattern has left the shift register SP and been succeeded by the data signals which can now be read on the output RD. In order to indicate this to the display unit DD the counting position 48 is decoded in the decoder DE2 and an indication signal is fed to the output DT. After another 15 clock pulses the last information bit associated with the data signal has reached the output BS and the next bit will be fed to the output IL4. Therefore the counting position 63 is decoded in the decoder DE2 which emits a gate signal to the AND-gate AG6 which passes the next clock pulse from the path GC2 to the reset input R on the flip-flop FF2 at the same time as the counter BC2 is reset to zero.

Figure 4:
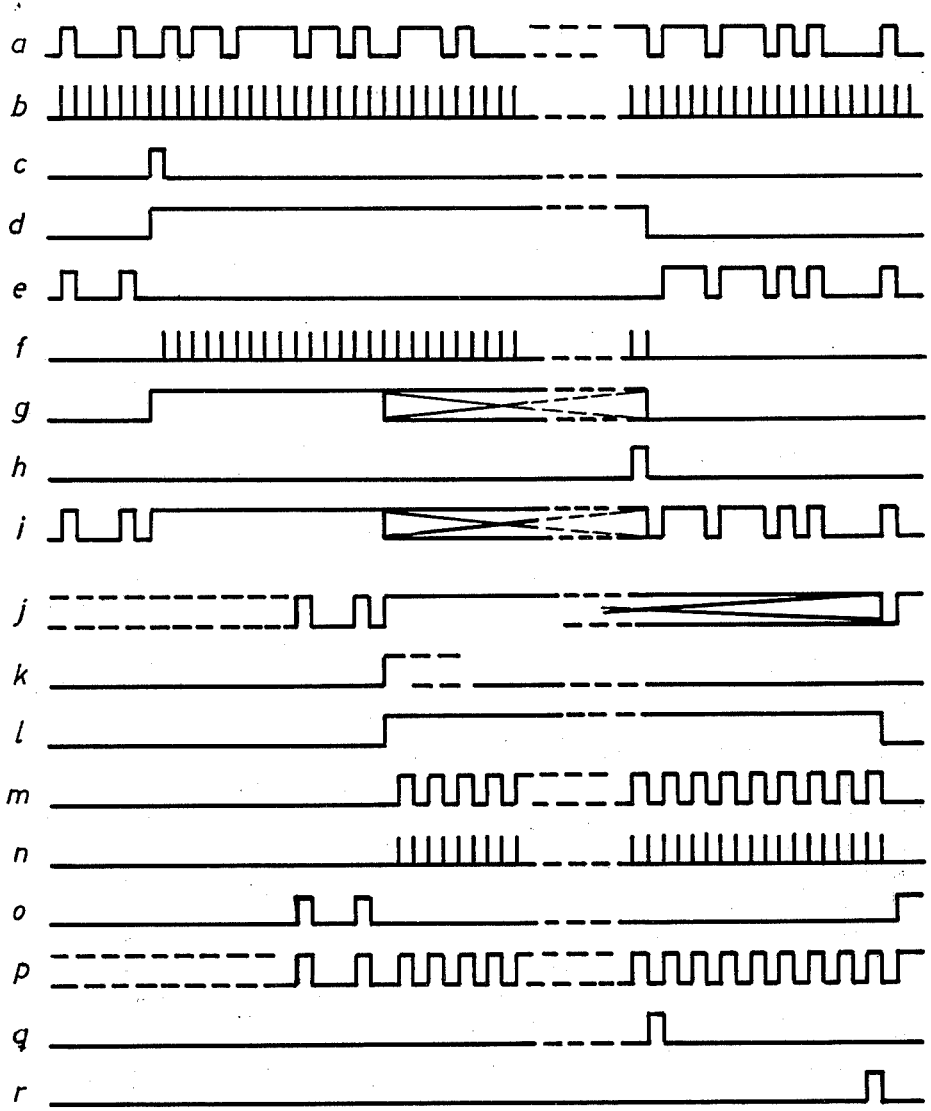
FIG. 4 shows a timing diagram illustrating the mode of operation of the units shown in FIGS. 2 and 3.

The mode of operation of the above described units is illustrated by the timing diagram in FIG. 4. On line a in FIG. 4, a digitalized speech signal is shown which is fed to the input IL1 on the input unit IU according to FIG. 2. The pulse train in line b represents the clock signal being fed to the input TC. The pulse in line c is the indication signal which is received on the path DI in order to indicate that there are data signals on the data bus TD which are to be transmitted on the telephone line SL. The signal in line d refers to the output SO1 from the flip-flop FF1 and in line e it is shown how the signals on the path SS1 are suppressed during the 1-state of the flip-flop. According to line f clock pulses are obtained during the same time on the path GC1 which causes the signals shown in line g to be fed to the path DF from the shift register PS. The same clock pulses are counted by the counter BC1 and after 63 pulses the pulse shown in line h appears on the output RS1 of the decoder DE1, such pulse causing the flip-flop FF1 to be re-set. In line i those signals are shown which reach the output IL2 from the input unit IU and which then are fed to the input IL3 of the output unit SU shown in FIG. 3. The output signal on the path BS from the shift register SP in FIG. 3 is shown in line j. When the synchronizing bit pattern is detected by the decoder DE2, a positive voltage jump occurs on the path DO, according to line k, which switches over the flip-flop FF2 according to line 1. While the flip-flop FF2 is set, the flip-flop FF3 generates the alternating signal shown in line m at the same time as the clock pulses according to line n are fed to the counter BC2. The flip-flop FF2 also choses the gate AG4 so that according to line o the data signals from the path BS are not fed to the path SS2 to the gate OG2. Instead this gate receives the above mentioned alternating signal on the path SQ and the signal fed to the output IL4 is the one shown in line p. The pulse in line q is the indication signal which is fed out on the output DT in order to indicate that the transmitted data signals can be read on the data bus RD and the pulse in line r is that reset signal which is fed out on path RS2 to the gate AG6 in order to reset the flip-flop to the zero-state. According to the embodiment all 48 information bits are read at the same time from the shift register SP. It is also possible to divide the read out procedure into several phases, for example three. In that case the decoder DE2 feeds out an indication signal to the output DT in the counting positions 16, 32 and 48 in order to indicate the beginning of each 16-bit interval and the shift register only needs to comprise 16 bits. With such an arrangement it is easy to vary the length of the data block in multiples of 16 bits. Instead of ending the block at a certain counting position the block ends can then be indicated by means of a special data code which, for example, is placed in the last eight bits of the block.

When the invention is applied to PCM the replacement signal, as already mentioned, should be identical with that code which was received immediately before the data block. In order to generate this replacement signal the flip-flop FF3 in FIG. 3, for example, can be replaced with a shift register to which those signals which are fed on path SS2 from the gate AG4 are continuously fed. When the synchronizing pattern, which in this case can be two PCM-words each indicating an extreme value of the speech signal, is detected, the flip-flop FF2 is switched over to its 1-state and the feeding on path SS2 ceases. By means of gate circuits which are activated by the 1-state of the flip-flop, the code stored in the above-mentioned shift register is instead fed to the output IL4 at the same time as it is fed back to the input of the shift register so that the code can be retransmitted several times as long as the flip-flop FF2 is set. Instead of generating the above-mentioned synchronizing pattern in order to render the identification of the data block possible, each code word which is transmitted can be provided with an extra marking bit. This can, for example, be coded in sucha way that a zero indicates that an associated code word is a PCM-word while an one indicates that the code word is data. In this manner it is possible to vary the block length quite freely and also to transmit single data words.

We claim:

1. In a telephone system of the type wherein the amplitude values of speech signals are transmitted in digital form, apparatus for transmitting additional digital information without disturbing a speech communication in progress comprising: at the sending side, an input means having a first input for receiving the digital speech signals, a second input for receiving the additional digital information and an output for delivering the digital speech signals interleaved with the additional digital information; at the receiving side, an output means having an input for receiving the digital speech signals interleaved with the additional digital information, a first output for delivering the digital speech signals as well as replacement signals instead of the interleaved additional digital information, said replacement signals in principle reproducing that amplitude value which was transmitted immediately prior to the additional digital information, and a second output for delivering the additional digital information; said input means comprising a first control means for, in dependence on the fact that the additional digital information is available on said second input, generating a first control signal having a duration corresponding to the transmission time for the additional digital information, a first data register means for storing the additional digital information, and a first gating means for, in the absence of said first control signal, forwarding the digital speech signals from said first input to said output and, in the presence of said first control signal, instead feeding the additional information from said first data register; and said output means comprising a second data register for successive intermediate storing of digital speech signals arriving at said input being interleaved with said additional information, said register being connected to said other output, a second control means for generating, in dependence on the fact that there is the additional digital information in said second data register, a second control signal having a duration corresponding to the transmission time for the additional digital information, a signal generator means for generating the replacement signals, and a second gating means for forwarding, in the absence of said control signal, the successive intermediate stored digital speech signals from said other data register to said first output and for feeding, in the presence of said other control signal, the replacement signals from said signal generator means to said first output at the same time as the additional digital information is fed from said second data register to said other output.

2. An apparatus according to claim 1, further comprising, at the sending side, a code generator means for generating a special identification code having at least one bit for transmission together with the additional digital information, and, at the receiving side, a code detector means for delivering, when said special identification code is in said second data register, an activation signal to said other control means.

3. An apparatus according to claim 1 or 2 wherein the digital speech signals are Delta-modulated and said signal generator means includes means for generating a signal consisting of alternate binary ones and binary zeros.

4. An apparatus according to claim 1 or 2 wherein the digital speech signals are pulse-code-modulated and said signal generator means includes means for registering a predetermined code.

5. An apparatus according to claim 4 wherein said predetermined code is that code which was transmitted immediately prior to the time slot and further comprising means for transmitting said code at least once.

* * * * *